United States Patent
Osborne et al.

(10) Patent No.: US 9,840,017 B2
(45) Date of Patent: Dec. 12, 2017

(54) DEVICE AND METHOD FOR CREATING PARTIAL CUTS IN FOOD PRODUCTS

(71) Applicant: Elliot Rudell, Torrance, CA (US)

(72) Inventors: Ian Osborne, Gardena, CA (US); George Foster, Placerville, CA (US); Elliot Rudell, Redondo Beach, CA (US); Tom Grimm, Napa, CA (US)

(73) Assignee: Elliot Rudell, Torrance, CA (US)

( * ) Notice: Subject to any disclaimer, the term of this patent is extended or adjusted under 35 U.S.C. 154(b) by 0 days.

(21) Appl. No.: 14/849,451

(22) Filed: Sep. 9, 2015

(65) Prior Publication Data

US 2016/0089804 A1   Mar. 31, 2016

Related U.S. Application Data

(60) Provisional application No. 62/056,521, filed on Sep. 27, 2014.

(51) Int. Cl.
*B26D 3/08* (2006.01)
*A47J 37/06* (2006.01)
*B26D 3/16* (2006.01)

(52) U.S. Cl.
CPC ............ *B26D 3/08* (2013.01); *A47J 37/0611* (2013.01); *B26D 3/16* (2013.01)

(58) Field of Classification Search
CPC .................................. B26D 3/08; B26D 3/16
USPC ............ 99/430, 596, 509; 30/299, 304, 305; 83/883
See application file for complete search history.

(56) References Cited

U.S. PATENT DOCUMENTS

| | | | | |
|---|---|---|---|---|
| 2,044,615 A | * | 6/1936 | Kennedy | A47J 37/0611 99/339 |
| 2,211,024 A | * | 8/1940 | Nardin | A47J 37/041 99/339 |
| 2,243,137 A | * | 5/1941 | Vaughan | A47J 37/0611 99/381 |
| 2,776,480 A | * | 1/1957 | Abel | B26B 27/00 30/124 |
| 3,465,802 A | * | 9/1969 | Alea | A47J 43/28 30/287 |

(Continued)

OTHER PUBLICATIONS http://www.slotdog.com/.

(Continued)

*Primary Examiner* — David Angwin
*Assistant Examiner* — John J Norton
(74) *Attorney, Agent, or Firm* — Cislo & Thomas, LLP

(57) ABSTRACT

A device for creating partial cuts, such as transverse spiral cuts, into an elongated food product, such as hot dogs, frankfurters, and wieners, the device having an upper housing section with at least one top blade and a lower housing section with at least one bottom blade, wherein closing the top housing on top of the lower housing with the elongated food product inside allows the top blades and the bottom blades to partially cut through the elongated food product creating a helical groove pattern around the outer surface of the elongated food product while leaving an inner core intact. The device may also have guide channels to guide a skewer through the inner core for easy removal of the food product from the housing. The device can also be provided as a kit with skewers, modified tongs, and a heating unit to cook the food product in the housing.

25 Claims, 9 Drawing Sheets

(56) References Cited

U.S. PATENT DOCUMENTS

| | | | | |
|---|---|---|---|---|
| 3,579,713 A * | 5/1971 | Kang | A22C 17/006 | 99/419 |
| 3,948,159 A * | 4/1976 | Vigerstrom | H05B 3/0004 | 99/339 |
| 3,999,293 A * | 12/1976 | Zubrycki | B26B 27/00 | 30/124 |
| 4,300,286 A * | 11/1981 | Panchula | A22C 7/0007 | 30/113.3 |
| 4,429,435 A * | 2/1984 | Walls | A22C 17/006 | 99/419 |
| 4,781,109 A * | 11/1988 | Wiebe, Jr. | A47J 37/041 | 99/341 |
| 4,967,477 A * | 11/1990 | Sanford | B26B 9/02 | 30/314 |
| 4,976,029 A * | 12/1990 | Kennedy | B26D 3/08 | 30/114 |
| 5,067,241 A * | 11/1991 | Goodman | B26B 27/00 | 30/278 |
| D329,967 S * | 10/1992 | Kennedy | D7/693 | |
| 5,174,195 A * | 12/1992 | Anderson | A22C 17/006 | 206/493 |
| D337,643 S * | 7/1993 | Betz, Jr. | D1/125 | |
| 5,746,106 A * | 5/1998 | Hodges | B26D 1/153 | 452/142 |
| 6,018,876 A * | 2/2000 | Hodges | B26B 3/04 | 30/278 |
| 7,065,880 B2 * | 6/2006 | Howman | A21C 15/04 | 30/114 |
| 8,232,510 B2 * | 7/2012 | Addesso | A47J 37/0611 | 219/386 |
| 8,241,688 B2 * | 8/2012 | Aguirre | A47J 47/005 | 426/518 |
| 8,584,565 B1 * | 11/2013 | Hortelius | A22C 11/00 | 30/124 |
| 2005/0005777 A1 * | 1/2005 | Steinberg | A47J 37/0611 | 99/349 |
| 2006/0174777 A1 * | 8/2006 | Roe | A22C 17/006 | 99/419 |
| 2007/0006740 A1 * | 1/2007 | Lam | A47J 37/0611 | 99/372 |
| 2008/0041365 A1 * | 2/2008 | Weggel | A47J 33/00 | 126/681 |
| 2008/0105137 A1 * | 5/2008 | Genslak | A47J 37/0611 | 99/350 |
| 2011/0139016 A1 * | 6/2011 | Romano | A47J 43/20 | 99/450.8 |
| 2012/0297991 A1 * | 11/2012 | Hueser | B26B 27/002 | 99/547 |
| 2014/0170255 A1 * | 6/2014 | Amend | A23G 1/203 | 425/289 |
| 2014/0272056 A1 * | 9/2014 | Parth | A21B 3/134 | 426/497 |

OTHER PUBLICATIONS

Bananza, http://www.chefn.com/Product.aspx?id=205.

Paradise Kiss Cyclkone—Spiral Hot Dog Sclicers, http://www.amazon.com/Paradise-Kiss-Cyclone-Spiral-Slicers/dp/B00PJT3U8Q.

Dachshund Shaped Hot Dog Cutter: Kids Food Slicing Device, http://www.amazon.com/Dachshund-Shaped-Hot-Dog-Cutter/dp/B0088OJB5U.

Dog Dicer, http://www.dogdicer.com/.

Heng Song Hot Dog Cutter Slicer Dicer Home Child Safe Kitchen, Toolshttp://www.amazon.com/Cutter-Slicer-Dicer-Child-Kitchen/dp/B00V4615G2.

The Octodog hot dog, shaperhttp://www.coolest-gadgets.com/20060714/the-octodog-hot-dog-shaper/.

Spiral Cutter for Hot Dogs and Wieners, http://outsetinc.com/item/76179.

Wunder Weener Triple Spiral Hot Dog, Slicershttp://www.amazon.com/dp/B0026JLUSO.

\* cited by examiner

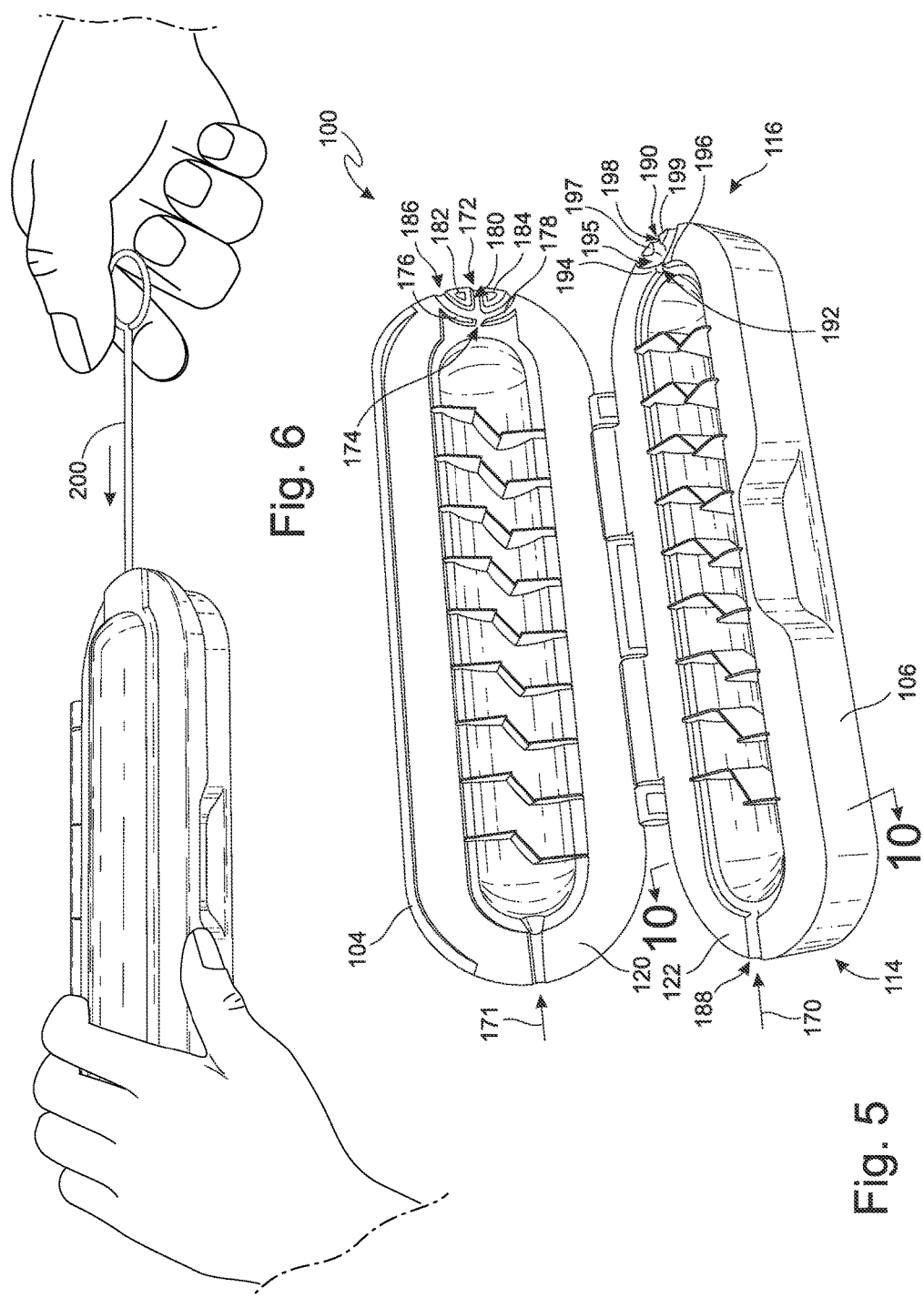

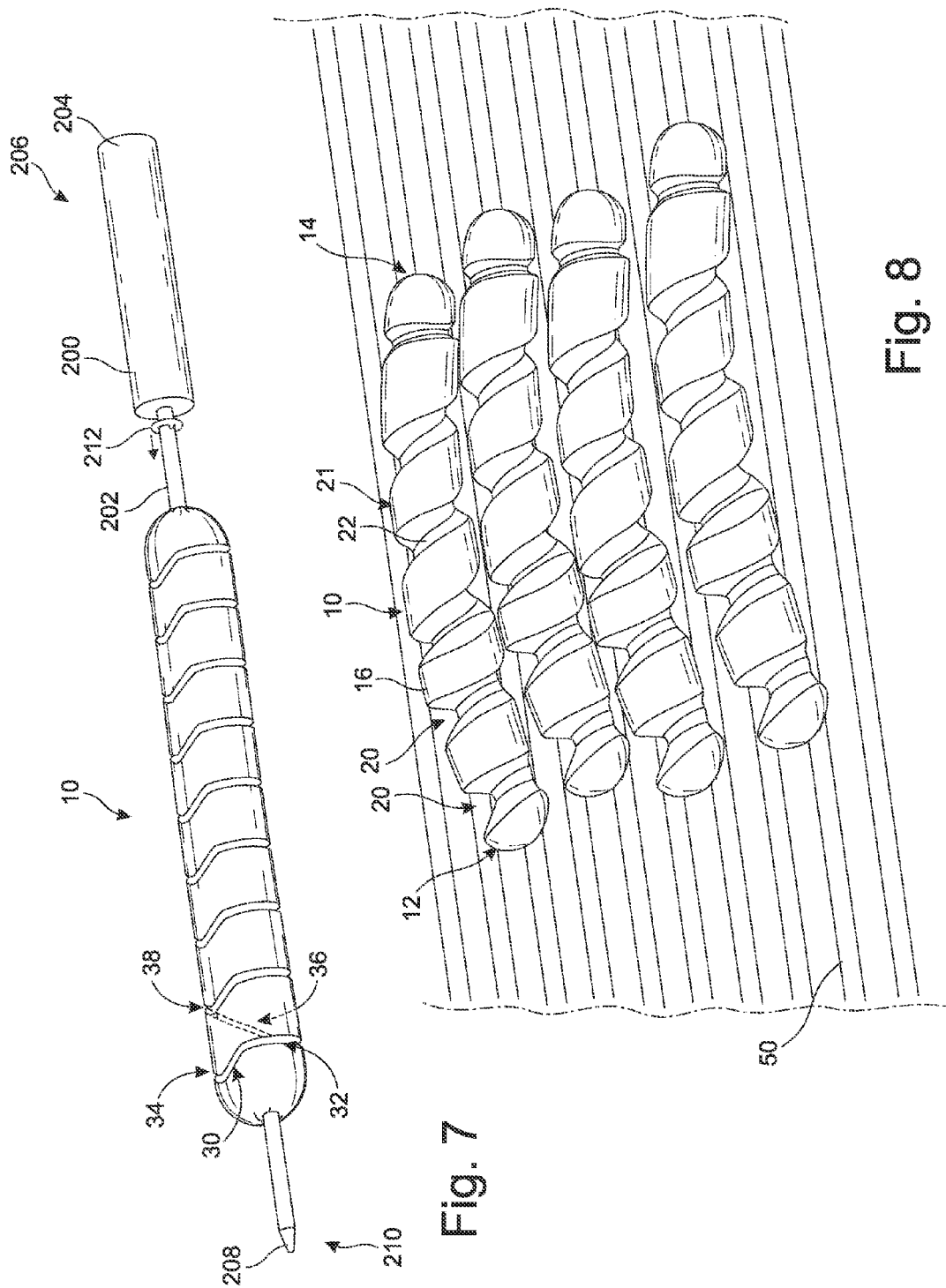

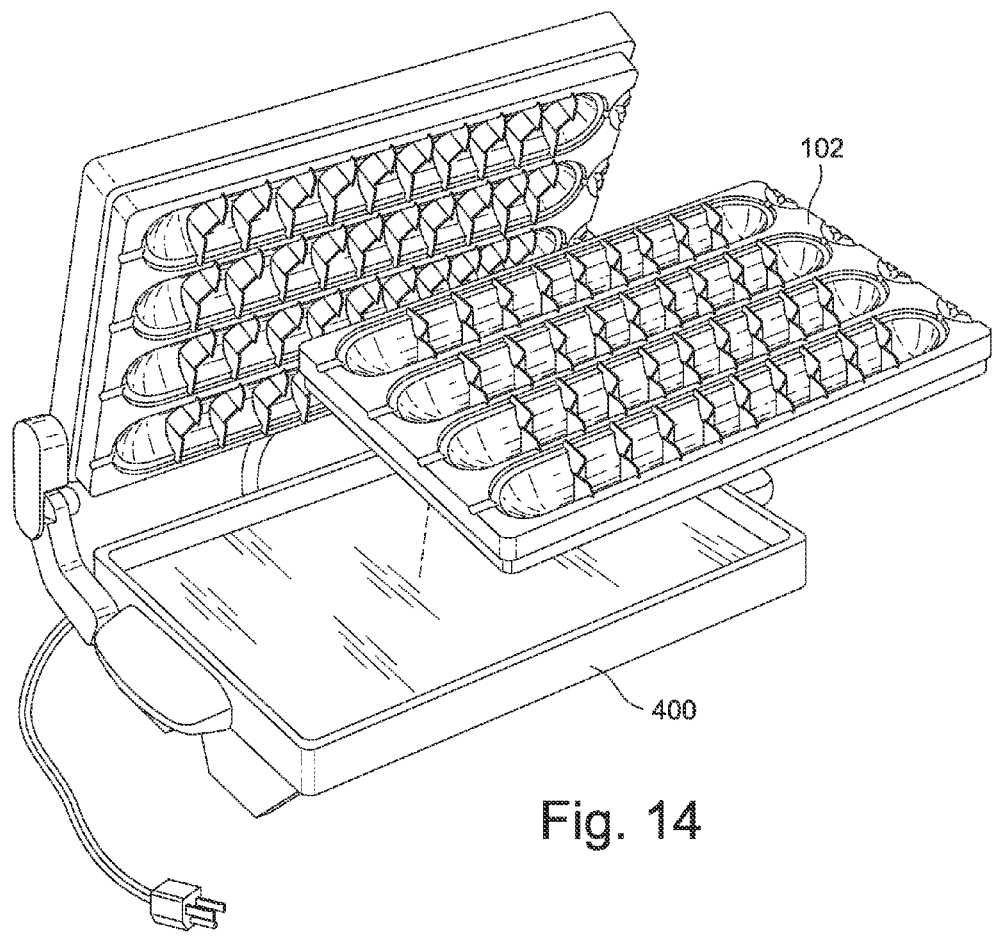
Fig. 14
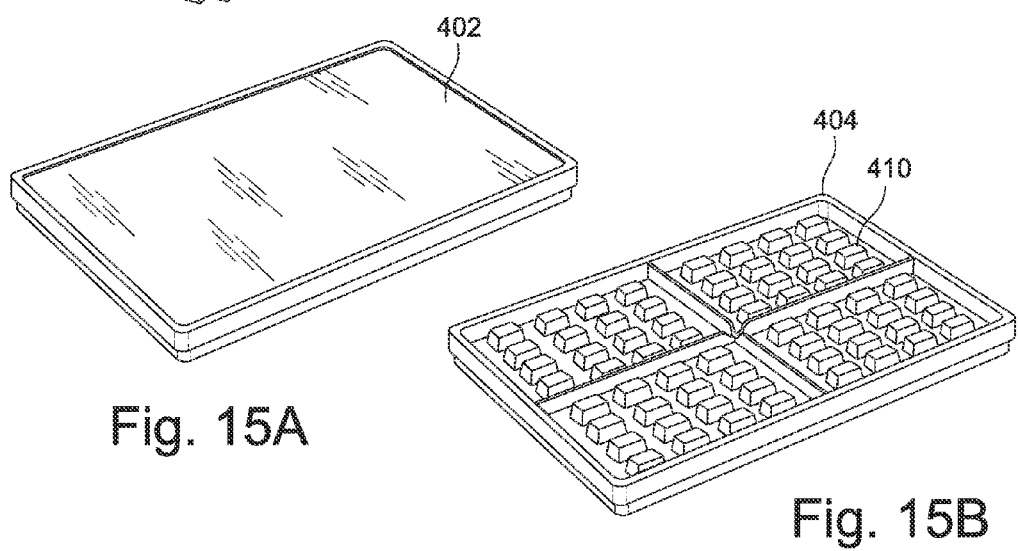
Fig. 15A
Fig. 15B

DEVICE AND METHOD FOR CREATING PARTIAL CUTS IN FOOD PRODUCTS

CROSS-REFERENCE TO RELATED APPLICATION

This patent application claims the benefit of U.S. Provisional Patent Application Ser. No. 62/056,521, entitled "Spiral Cut Hot Dog Device and Method for Creating Spiral Cuts in a Hot Dog," filed Sep. 27, 2014, which application is incorporated in its entirety here by this reference.

TECHNICAL FIELD

This invention relates to kitchen and cooking devices, in particular, devices used in preparing foods with partial cuts.

BACKGROUND

The hot dog, also spelled hotdog, is a popular food product eaten all over the world, and known by many different names, such as frankfurter, franks, wieners, dog, and the like. Technically, the hot dog is a frankfurter or wiener served on a bun. Nevertheless, the terms hot dog, hotdog, frankfurter, franks, wieners, and the like, will mean the same thing and may be used interchangeably for the purposes of this application, since there is no consistency in usage or recognized distinctions among the general public. Generically, these terms may be referred to as a sausage as they are all types of sausages made in a similar fashion.

During the past several years gourmet food authorities and barbecue aficionados have identified the improved taste of hot dogs that have been spiral cut, to allow for the flames and heat of cooking to penetrate into the hot dog, as opposed to only touching the outer surface of the hot dog.

One popular process is spiral cutting of the hot dog—cutting the meat so that it remains integrally one unit, but is opened up as a result of the controlled cutting so that the cooking process more effectively cooks not simply the outer meat but also the inner meat that has been exposed. Additionally, the cutting process provides areas into which the user can easily place condiments such as mustard, ketchup, relish, and the like.

Several efforts have been undertaken to provide cooks and end-users with a means to spiral cut hot dogs. Such prior art products and methods have proven to be time consuming and awkward to use.

For example, one method to achieve spiral cuts on a hot dog is to impale a hot dog lengthwise onto a skewer, and then slowly rotate the skewer (and the hot dog) while holding a sharp knife in an angled position against the skewer. This may work to create spiral cuts, but it is time consuming, challenging, and horribly inconsistent. Furthermore, the insertion of the skewer into the end of the hot dog requires carefulness to avoid puncturing a sidewall of the hot dog as the user attempts to guide it completely through the longitudinal axis of the hot dog.

One product requires the lengthwise insertion of the hot dog into a long grooved tube and then the slow rotation of the hot dog (and the grooved tube) while a knife is held in position and travels the spiral groove of the tube during the process. The user has to take care not to insert the knife too deeply into the hot dog so as not to weaken the integrity of the hot dog so much that it can no longer be handled. In addition, the inability to remove the spiral cut hot dog from the tube without tearing it into pieces, and an easy method for cleaning the inside of the tube, render the product user-unfriendly.

A second design utilizes a cylindrical housing having a sharp blade inside the cylindrical housing projecting radially inwardly. A hot dog is inserted into the cylindrical housing, then rotated to allow the sharp blade to create a spiral cut. This causes the hot dog to be hanging from the housing, typically in mid-air, susceptible to extending like a spring and easily tearing into pieces. In addition, the sharp blades are extremely dangerous, particularly if a child were to get a hold of this device and stick his or her finger into the housing. Also, because the blade is only accessible through the open ends of the cylinder, cleaning the device is difficult.

Another variation uses an injection molded plastic spiral ring that a user would twist over a hot dog. The inner spiral surface of the ring is molded to function as a sufficiently sharp blade to cut into the hot dog meat as the user manually rotates either the hot dog through the cutting unit, or rotates the cutting unit around the hot dog. The system will work as long as the user is careful not to cut into the meat with the leading edge of the ring. Also, this method, by design, requires a tedious number of manual rotations, while the spiral cut hot dog dangles out of the end, and can stretch out and tear off. Reviews of this product at online stores testify to its inconvenience.

Another variation cuts hash marks into the surface of the hot dog using a handle containing a set of blades. The blades are arranged in crisscross fashion. The user places the hot dog on a flat surface, not included with the device, and presses the blades of the handle against the hot dog to create crisscross cuts on one side of the hot dog. If the user wants cuts on the other side of the hot dog, the user has to remove the hot dog wedged inside the blades, rotate the hot dog, then press the handle and blades against the opposite surface of the hot dog. Therefore, in order to create cuts all around the hot dog, the user must take multiple actions. In addition, once the user is finished, cleaning out the residue in between the blades may be difficult due to the design configuration of the blades. Furthermore, the user will need a clean surface upon which the hot dog must be placed in order to use this device. After using the device, the user would have to clean not only the device, but also the surface. Finally, due to the lack of a bottom housing and the cylindrical nature of the hot dog, there may be some inefficiencies in using this device as the hot dog can roll around while the user is trying to create the hash marks.

Other hot dog slicers involve cutting the hot dog into bite-sized pieces rather than spiral cuts. These devices use a slotted base upon which the hot dog is mounted, and sharp blades or wires on an upper housing that when pressed down towards the slotted base allows the sharp blades to pass in between the slots all the way to the bottom to completely cut the hot dog into multiple, individual bite size pieces. In addition, there is no mechanism for stopping the blades from cutting all the way through the hot dog.

Still other hot dog slicers cut the hot dogs into interesting shapes. For example, one product utilized a molded tower-like plastic structure onto which a hot dog was pressed downward so that the meat of the hot dog was cut longitudinally, beginning at one tip and ending approximately halfway up the torso of the hot dog, resulting in a funny "octopus" looking meat treat that had cut "tentacles." All of the meat at the uncut end of the hot dog remained as original. This type of device defeats the purpose of eating the hot dog as a traditional hot dog on a bun, and is instead used for entertaining children.

Therefore, there is still no device that allows one to create consistent, uniform, spiral cuts on a hot dog in a quick and easy manner with quick clean up. For the foregoing reasons there is a need for a device that can quickly and easily create partial cuts in a food product, such as a spiral or helical cut in a sausage-like food product. The terms spiral and helical are also used interchangeably in this application and intended to mean the same thing.

SUMMARY

The invention generally comprises a housing having a top housing section with at least one blade and a bottom housing section with at least one of blade, wherein the at least one blade from the top housing section and the at least one blade from the bottom housing section interact with each other to partially cut an elongated food product, such as a sausage, preferably in a spiral or helical formation. For the purposes of this application, "partially cut," "partial cut," and variations thereof mean that the food product is purposely not cut into separate pieces, but rather, is left with an inner core of the food product intact, preferably extending the length of the food product.

In operation, a user would place a sausage onto the bottom housing section and then close the top housing section over the sausage, perhaps applying some gentle force for the blades in the top and bottom housing sections to penetrate into the meat of the sausage. The blades are configured to interact one with another so that when pressed together they will combine to cut into, but not all the way through, the hot dog meat.

When the top housing section is removed or lifted away from the hot dog, the hot dog will be as desired, but will remain as one integral unit, without any portions completely cut off. While the hot dog is in the housing, a skewer can be quickly and accurately inserted into a hole provided at one or both ends of the closed housing, thereby penetrating the hot dog at its end and traveling through the inner core of the hot dog. When the housing is opened, the user can hold the external end of the skewer and easily remove the now partially cut hot dog from the housing. The skewer can also be utilized to transport the cut hot dog to a cooking device.

In some embodiments, the housing is a grill connectable to a heating unit, and therefore, functions as the cooking device.

Once the user has removed the cut hot dog from the housing, he can then choose his or her favorite means of cooking, for example grilling, boiling, broiling or cooking in a microwave or an oven. Although it would be recommended that the skewer be removed from the hot dog prior to the cooking process, it is not out of the question that some users might want to cook the hot dog while it was still impaled on the skewer.

As the hot dog is cooking (and having been removed from the skewer) the heating process will cause the hot dog to expand open at its cuts, thereby allowing the cooking heat and/or flame to effect the otherwise inaccessible inner meat. The result is a more consistently cooked hot dog.

Once the hot dog is cooked, but prior to it being eaten, the expanded cuts will provide a convenient location for condiment placement.

Preferably, the housing of the invention is a two-piece housing comprised of a top housing section and bottom housing section. Both units could be manufactured of the same material. For example, a reliable and efficient means of production could be injection molding of food-grade plastics such as high impact styrene, polypropylene or polycarbonate. Alternatively, the unit could be made of metal. It would be desirable that the top housing section and the bottom housing section are pivotally attached one to another, preferably in a removable fashion, although the two parts could also be permanently hinged together.

Alternatively, the top and bottom housing sections could be removable one from another, and so designed as to accurately align one with another during the cutting process.

In the embodiment in which the two housing sections are removably attached to one another, a preferred design would be for a shaft to be molded on one housing section and then a semi-circular clamp-like hinge to be molded into the coordinating area of the other housing section. That would allow a user to snap-fit the two parts together, use the unit as desired, and then pop the two parts apart when it was desired for them to be cleaned separately. Alternatively a plastic or metal rod could run lengthwise through a long hinge on one side of the device, with coordinated hinge components on both the top and bottom housing section of the device.

The top and bottom housing sections may have a sharp or semi-sharp blade to create the partial cuts into the surface of the sausage. In some embodiments, the blades may be situated in generally a diagonal position relative to the front and back sides of the top or bottom housing sections, so that the cutting effect would create a spiral or helical pattern substantially across the hot dog and along the longitudinal length of the hot dog. For the preferred spiral effect, the pattern of the blades is generally a helix or simulated helix, so that the cutting action would cut one continuous, generally helical pattern into the outer surface of the meat of the hot dog, leaving an inner core intact so that the hot dog remains in one piece. The blades could be integrally molded into the top and bottom housing sections. Alternatively, the blades could be separate elements either installed individually in production, or could be manufactured as a cassette that contained all of the blades for that section, with the cassette then installed into the housing. For example, the blade cassette could be manufactured from food grade stainless steel, while the outer housings could be molded plastic.

Although lengths and diameters of commercial hot dogs can vary, general dimensions for the housing could be approximately 12 inches long and 1.5 inches in diameter or thickness. However, devices of the invention could be manufactured in different sizes to accommodate different lengths and diameters of sausages.

Although a preferred embodiment of the invention would be to provide a generally helical cut about the longitudinal axis of the hot dog, it should also be noted that the blades of the invention could be so shaped as to cut different patterns into any and all sidewalls of the hot dog. For example, multiple straight partial cuts could be imparted into the meat, so that the hot dog, once cooked and having expanded, would look segmented, but would remain intact as one integral unit because an inner core of the hot dog was not cut through.

An alternative product embodiment of the invention could contain both the controlled cutting blades as well as an electrical heating unit to both cut and also cook the hot dog, or hot dogs. For example, the housing and the blades can be made of metal and be inserted into an electrical heating unit that functions as a cooking grill. The user could insert a hot dog or several hot dogs into the unit, close a lid to affect cutting of the hot dog or hot dogs, turn on a power source to cook the hot dogs, and then open the lid and remove the cooked and cut hot dogs.

The cutting and cooking embodiment could include a removable housing to be interchanged with a different housing. This would permit the user to also utilize the heating units to grill products other than cut hot dogs. For example, the user could use the heating units to cook hamburgers or steaks. The heating units, commonly known to those skilled in the art, would generally be of the same design and construction as is common to most all portable grilling units, such as the George Foreman® Grill which utilizes electrical power to heat up cooking fins and thereby cook meat that has been placed into the unit. The unique features of this embodiment of this invention is that the outer housing and its heating units are so designed and manufactured as to be compatible with a specially designed removable or permanent component containing the spiral-cutting blades, as described elsewhere in this application.

The heating unit can also be an open fire, an oven, a stove top, a burner, and the like. Therefore, the housing can be removed and placed over any type of heat to cook the food product inside the housing. Therefore, in some embodiments, a separate heating unit may not be necessary for purchase.

BRIEF DESCRIPTION OF DRAWINGS

FIG. 5 shows the embodiment in FIG. 4 without the skewer.

FIG. 6 shows an embodiment of the present invention in the closed configuration with the food product inside and a skewer being inserted into the food product.

FIG. 7 shows a food product that has been partially cut with its inner core impaled properly with a skewer.

FIG. 8 shows a plurality of food products being cooked after the partial cuts have been made. Note the expansion of the partial cuts.

FIG. 14 shows the embodiment in FIG. 11 showing the removability of the housing.

FIGS. 15A and 15B show different versions of the housing.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
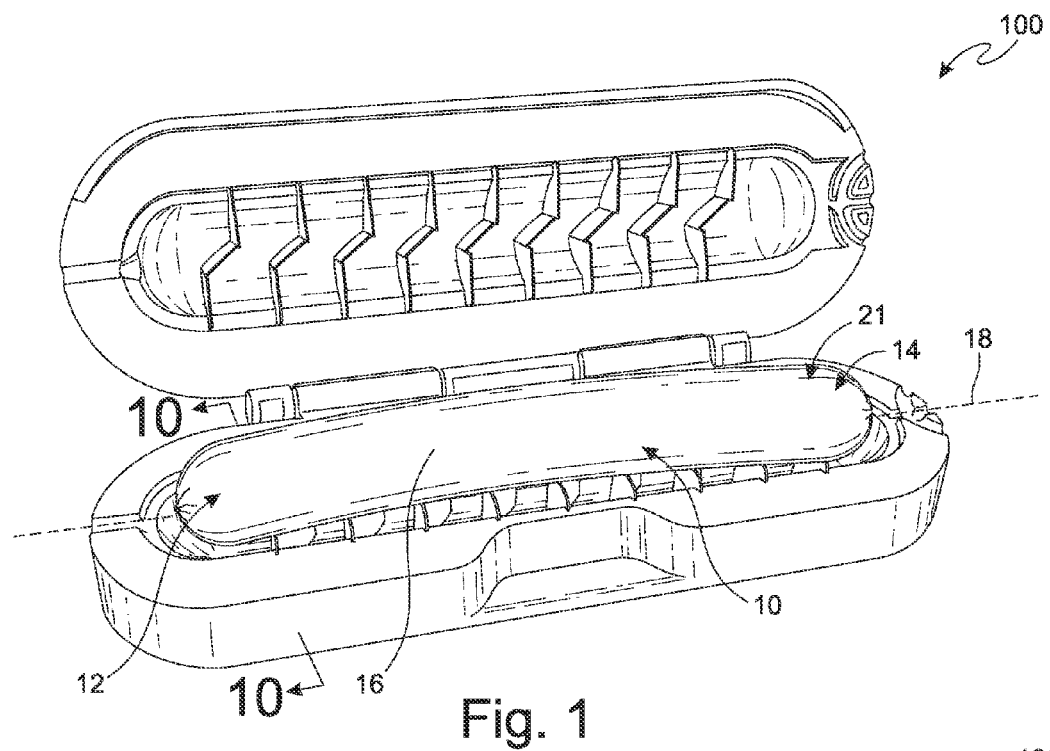
FIG. 1 shows an embodiment of the present invention with a food product properly placed.

Referring to FIG. 1, the present invention is directed towards a device 100 for quickly, easily, consistently, and safely creating partial cuts into a food product 10 to enhance the eating experience and the flavor of the food product. Preferably, the food product 10 is an elongated food product. More preferably, the elongated food product is generally cylindrical in shape, like sausages, zucchini, and the like. As such, the elongated food product 10 has a first end 12, a second end 14 opposite the first end 12, and an elongated body 16 therebetween. The elongated food product 10 defines a longitudinal axis 18 through the first and second ends 12, 14. It is known that some sausages tend to be curved and food products in general are not perfect geometric shapes; therefore, the term "generally" may be used to account for these types of variations and imperfections, and the description in this application pertains to these food products as if they had a straight cylindrical configuration like traditional frankfurters, wieners, and hot dogs.

Figure 2:
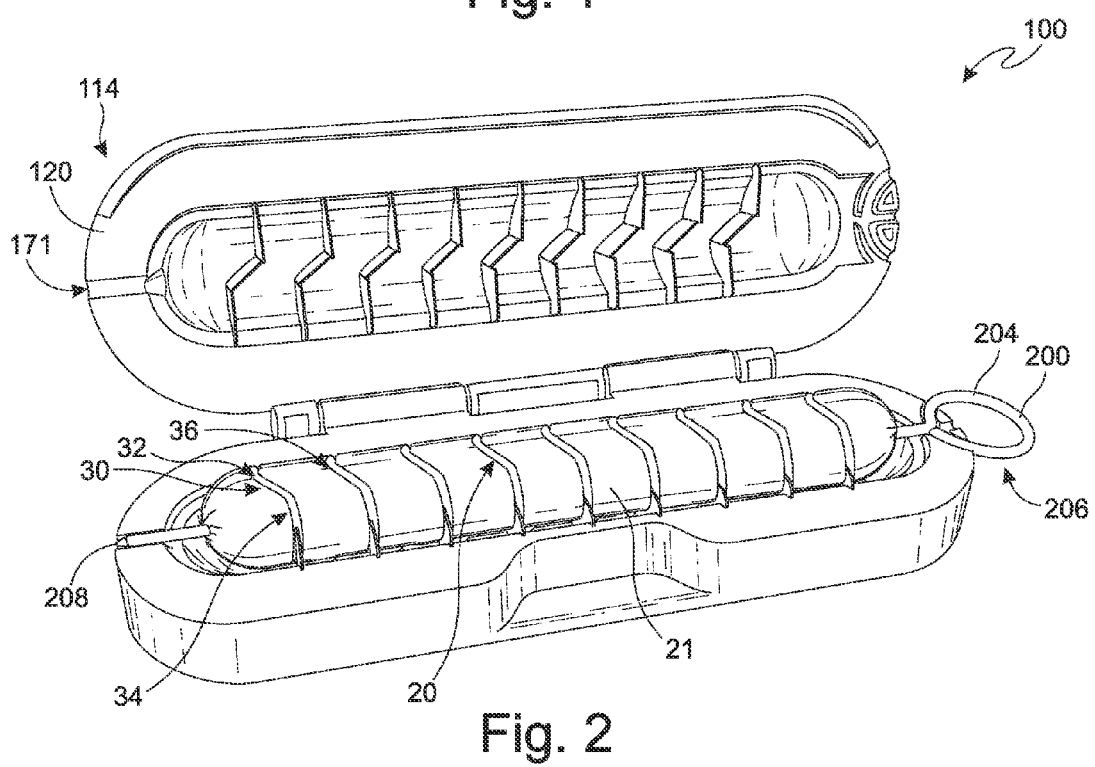
FIG. 2 shows the embodiment in FIG. 1 in the open configuration after partially cutting the food product.

As shown in FIG. 2, once the device 100 is used on the food product 10, a partial cut 20 is created in the food product 10. The partial cut 20 involves creating one or more slits or grooves in the outer surface 21 of the food product 10 so as to increase the total exposed surface area of the food product 10 without completely slicing the food product 10 into pieces. Therefore, the partial cut involves leaving a longitudinal core 22 (see FIG. 8) intact so that the food product 10 remains as a single integral piece, and the partial cut 20 exposes a pocket in which condiments can be held. The partial cut 20 may be created anywhere along the food product 10, whether it be transverse to the longitudinal axis 18, parallel to the longitudinal axis 18, or oblique to the longitudinal axis 18. The partial cut 20 may be a single continuous cut, or a series of discrete cuts throughout the elongated food product 10. Thus, designs, such as straight parallel cuts, curved cuts, cross-hatching, and the like can be created. In some embodiments, pictures, characters, symbols, names, and any other mark can be created with the partial cuts. Thus, food establishments, sports teams, and other organizations can even cut their brand name into their hot dogs. Preferably, the partial cut 20 creates at least one generally transverse groove in the elongated food product 10. More preferably, the generally transverse groove is in the form of a spiral or helix that circumscribes the outer surface 21 of the food product 10 while traversing axially along the longitudinal length of the elongated food product 10.

Figure 3:
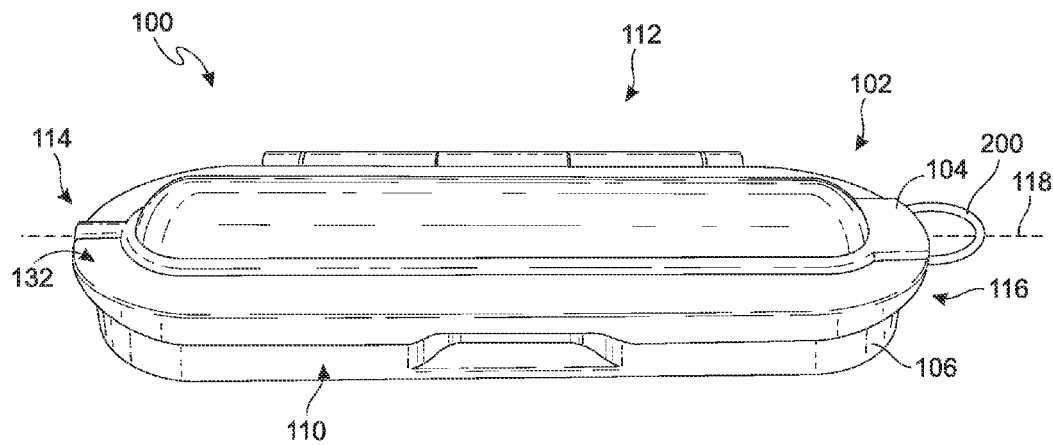
FIG. 3 shows a perspective view of an embodiment of the present invention in the closed configuration.
Figure 4:
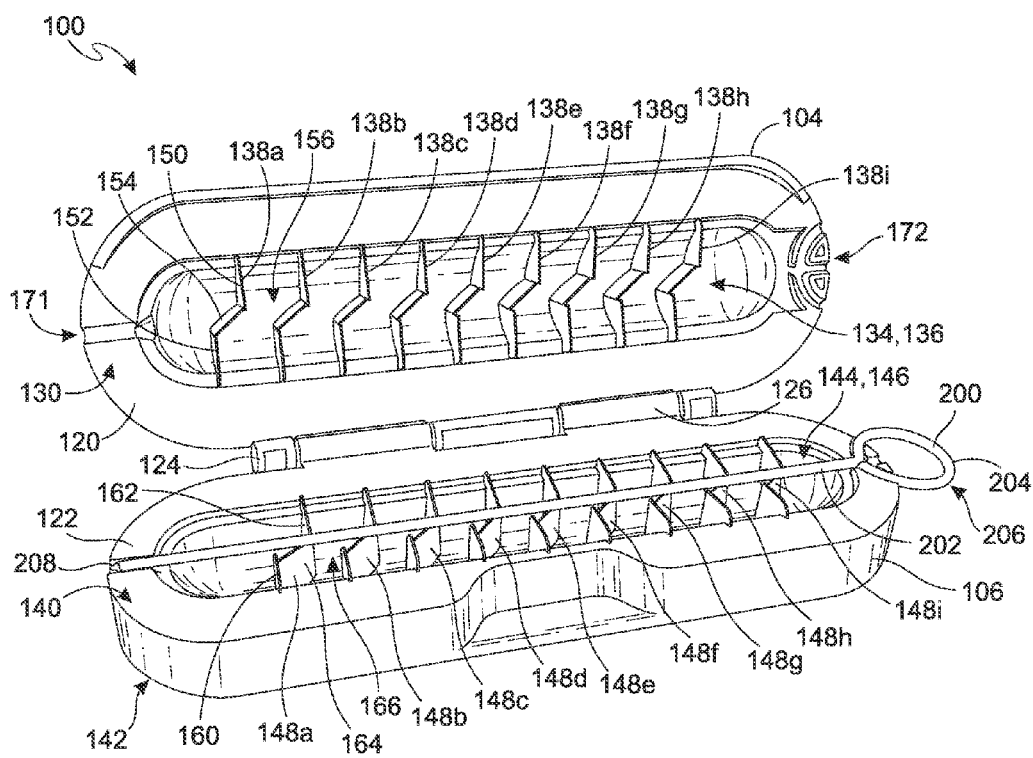
FIG. 4 shows the embodiment from FIG. 3 in the open configuration.

As shown in FIGS. 3-5, the device 100 comprises a housing 102. The housing 102 is preferably an elongated housing having a front side 110, a back side 112 opposite the front side 110, a first end 114 adjacent to the front side 110 and the back side 112, and a second end 116 opposite the first end 114 and adjacent to the front side 110 and the back side 112, the elongated housing 102 defining a longitudinal axis 118 through the first and second ends 114, 116. In the preferred embodiment, the housing 102 comprises a top housing section 104 and a bottom housing section 106, the top housing section 104 having a flat bottom wall 120 and the bottom housing section 106 having a flat top wall 122, wherein the top housing section 104 can be mounted on top of the bottom housing section 106 with the flat bottom wall 120 adjacent to the flat top wall 122 for a closed configuration as shown in FIG. 3.

Due to the configuration and arrangement of the top housing section 104 relative to the bottom housing section 106, the partial cut 20 may be created in a single action by compressing the top housing section 104 against the bottom housing section 106. Once the food product 10 is in place within the housing 102, this single action motion can create the complete desired partial cut 20 in less than one second; therefore, handling of the uncooked food product is minimized. In addition, due to the configuration of the top housing section 104 and the bottom housing section 106, the partial cut 20 is made by full compression of the top housing section 104 on the bottom housing section 106; therefore, the user does not have to judge how far the top housing section 104 must be pressed towards the bottom housing section 106. With full compression, the housing 102 creates the proper partial cuts 20 every time. So the user never has to be concerned whether the housing 102 will completely cut through the sausage creating discrete individual pieces. Furthermore, due to the configuration and arrangement of the top housing section 104 and the bottom housing section 106, no dangerous blades are exposed during the cutting action.

In some embodiments, the top housing section 104 and the bottom housing section 106 may be hingedly connected together at the back side 112 to couple the top housing section 104 to the bottom housing section 106. For example, a shaft 124 may be molded on one housing section (e.g. the top housing section 104) and a semi-circular hook 126 may be molded into the coordinating area of the other housing section (e.g. the bottom housing section 106). The two housing sections 104, 106 can then snap-fit together to create a hinge. The two housing sections 104, 106 can be separated apart as desired, for example, for cleaning or storage.

Alternatively a plastic or metal rod could run lengthwise through one or more elongated channels on the back side 112 of the housing 102, creating coordinated hinge components on both the top and bottom housing sections 104, 106 of the device 100 to couple the top housing section 104 to the bottom housing section 106. Alternatively, guides may project from either the top housing section 106 or the bottom housing section to guide the top housing section 104 onto the bottom housing section to couple the top housing section 104 to the bottom housing section 106 for a proper fit. Other ways of coupling the top housing section 104 to the bottom housing section 106 can be used so that the top housing section 104 can be pressed against the bottom housing section 106.

As shown in FIGS. 4 and 5, the top housing section 104 comprises a top inner side 130 and a top outer side 132. A top central core 134 of the top inner side 130 is recessed towards the top outer side 132 creating a top cavity 136 on the top inner side 130, leaving the flat bottom wall 120 surrounding the top cavity 136. As the preferred embodiment is used for sausages, the top central core 134 of the top inner side 130 may be a semi-cylindrical top wall defining a top semi-cylindrical cavity. However, any other shape, such as block shape, triangle shape, faceted shapes, and the like can be used so long as the food product can fit and be partially cut as discussed herein. Protruding from the top central core 134 of the top inner side 130 and occupying the top cavity 136 are a plurality of top blades 138*a-i*. Any number of top blades 138*a-i* can be used depending on how extensive the partial cuts are to be. In addition, the top blades 138*a-i* may be characterized as a single blade or a single continuous blade having multiple cutting regions. Therefore, the present invention can be made with at least one top blade.

Similarly, the bottom housing section 106 comprises a bottom inner side 140 and a bottom outer side 142. A bottom central 144 core of the bottom inner side 140 is recessed towards the bottom outer side 142 creating a bottom cavity 146 on the bottom inner side 140, leaving a flat top wall 122 surrounding the bottom cavity 146. As the preferred embodiment is used for sausages, the bottom central core 144 of the bottom inner side 140 may be a semi-cylindrical bottom wall defining a bottom semi-cylindrical cavity. However, any other shape, such as block shape, triangle shape, faceted shapes, and the like can be used so long as the food product can fit and be partially cut as discussed herein. Protruding from the bottom central core 144 of the bottom inner side 140 and occupying the bottom cavity 146 are a plurality of bottom blades 148*a-i*. Any number of bottom blades 148*a-i* can be used depending on how extensive the partial cuts are to be. In addition, the bottom blades 148*a-i* may be characterized as a single blade or a single continuous blade having multiple cutting regions. Therefore, the present invention can be made with at least one bottom blade.

The plurality of top blades 138*a-i* and the plurality of bottom blades 148*a-i* are configured to create at least one partial cut 20 into an outer surface 21 of the elongated food product 10 leaving an inner core 22 intact as shown in FIG. 8. In the preferred embodiment, the partial cut 20 is a generally transverse groove across the outer surface 21 of the elongated food product that leaves an inner core 22 of the elongated food product 10 intact. More preferably, the transverse groove creates a generally helical or spiral groove pattern on the elongated food product 10. The term "generally transverse" means that the partial cut moves in a transverse direction from one side of the food product 10 to the other side whether it cross the longitudinal axis 18 of the food product 10 in a perpendicular manner or an oblique manner. Preferably, the inner core 22 is radially inward relative to the transverse groove. Preferably, the blades 138*a-i*, 148*a-i* may be configured to cut deeply enough into the food product 10 so that the inner core 22 has an inner core diameter that is half the diameter of the original food product 10.

Each top blade 138*a-i* may have a top-front end 150 adjacent to the front side 110 of the housing 102, a top-back end 152 adjacent to the back side 112 of the housing 102, and a top intermediate portion 154 therebetween. Each top blade 138*a-i* may be generally parallel to each other and spaced apart to define a top space 156 therebetween. In some embodiments, the top blades 138*a-i* may traverse straight across from the front side 110 of the housing 102 towards the back side 12 of the housing 102 perpendicular to the longitudinal axis 118 of the housing 102. This would create generally transverse grooves that are parallel to each other along the length of the elongated food product 10 and perpendicular to the longitudinal axis 18 of the food product.

However, in order to create generally transverse grooves that form a helical pattern, the top-front end 150 and the top-back end 152 of each top blade 138*a-i* should be axially offset relative to each other. By way of example only, the top-back ends 152 of each top blade 138*a-i* may be closer to the first end 114 of the housing 102 relative to their respective top-front ends 150. Axially offsetting the top-front end 150 relative to the top-back end 152 of each top blade 138*a-i* can be accomplished by curving the top intermediate portion 154. In some embodiments, creating curved blades can be achieved in the injection molding of the top and bottom housing sections 104, 106 by designing shut-offs in the molds. The result is the mold-ability of the blades as under-cuts in the outer surfaces 132, 142 of each housing section 104, 106, respectively. This would leave open slots in the housing 102 adjacent to their respective blades, which could be desirable for water flow-through when washing the housing after usage.

Preferably, for manufacturing reasons, axially offsetting the top-front end 150 relative to the top-back end 152 of each top blade 138a-i is accomplished using a step design to avoid curved blades. For example, the top-front end 150 and the top-back end 152 may be perpendicular to the longitudinal axis 118, but axially offset. The top intermediate portion 154 connecting the top-front end 150 and the top-back end 152 may pass through the longitudinal axis 118 and create an oblique angle with the longitudinal axis 118 creating a "Z"-shaped blade having a step-like pattern when viewed from the top. Although a "Z"-shaped blade may not, at first, appear to create a spiral cut in a sausage, when configured as described further below, the "Z"-shaped pattern does indeed create a spiral cut in an elongated food product 10.

To maintain an inner core 22 that remains intact, the top intermediate portion 154 of each top blade 138a-i may be recessed or made shorter relative to the top-front end 150 and the top-back end 152. The recessed portion may be gradual or stepped. Due to the recess, when the top housing 104 is closed the recessed top intermediate portion 154 may not cut into the sausage as deeply, from the top to bottom, as the top-front end 150 and the top-back end 152.

Similarly, each bottom blade 148a-i may have a bottom-front end 160 adjacent to the front side 110 of the housing 102, a bottom-back end 162 adjacent to the back side 112 of the housing 102, and a bottom intermediate portion 164 therebetween. Each bottom blade 148a-i may be generally parallel to each other and spaced apart to define a bottom space 166 therebetween. In some embodiments, the bottom blades 148a-i may traverse straight across from the front side 110 of the housing 102 towards the back side of the housing 102 perpendicular to the longitudinal axis 118 of the hosing 102. This would create generally transverse grooves that are parallel to each other along the length of the elongated food product 10 and perpendicular to the longitudinal axis 18 of the food product 10.

However, in order to create generally transverse grooves that form a helical pattern, the bottom-front end 160 and the bottom-back end 162 of each bottom blade 148a-i should be axially offset relative to each other. By way of example only, the bottom-front ends 160 of each bottom blade 148a-i may be closer to the first end 114 of the housing 102 relative to their respective bottom-back ends 162, which may be opposite to the arrangement of the top blades 148a-i. Axially offsetting the bottom-front end 160 relative to the bottom-back end 162 of each bottom blade 148a-i can be accomplished by curving the bottom intermediate portion 164. Preferably, axially offsetting the bottom-front end 160 relative to the bottom-back end 162 of each bottom blade 148a-i can be accomplished in a step-like fashion. For example, the bottom-front end 160 and the bottom-back end 162 may be perpendicular to the longitudinal axis 118, but axially offset. The bottom intermediate portion 164 connecting the bottom-front end 160 and the bottom-back end 162 may pass through the longitudinal axis 118 and create an oblique angle with the longitudinal axis 118.

Figure 10:
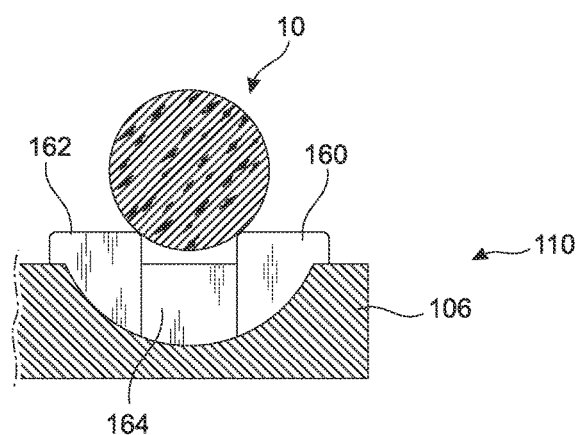
FIG. 10 shows a cross-section of the bottom housing section shown in FIG. 5 taken through line 10-10.
Figure 11:
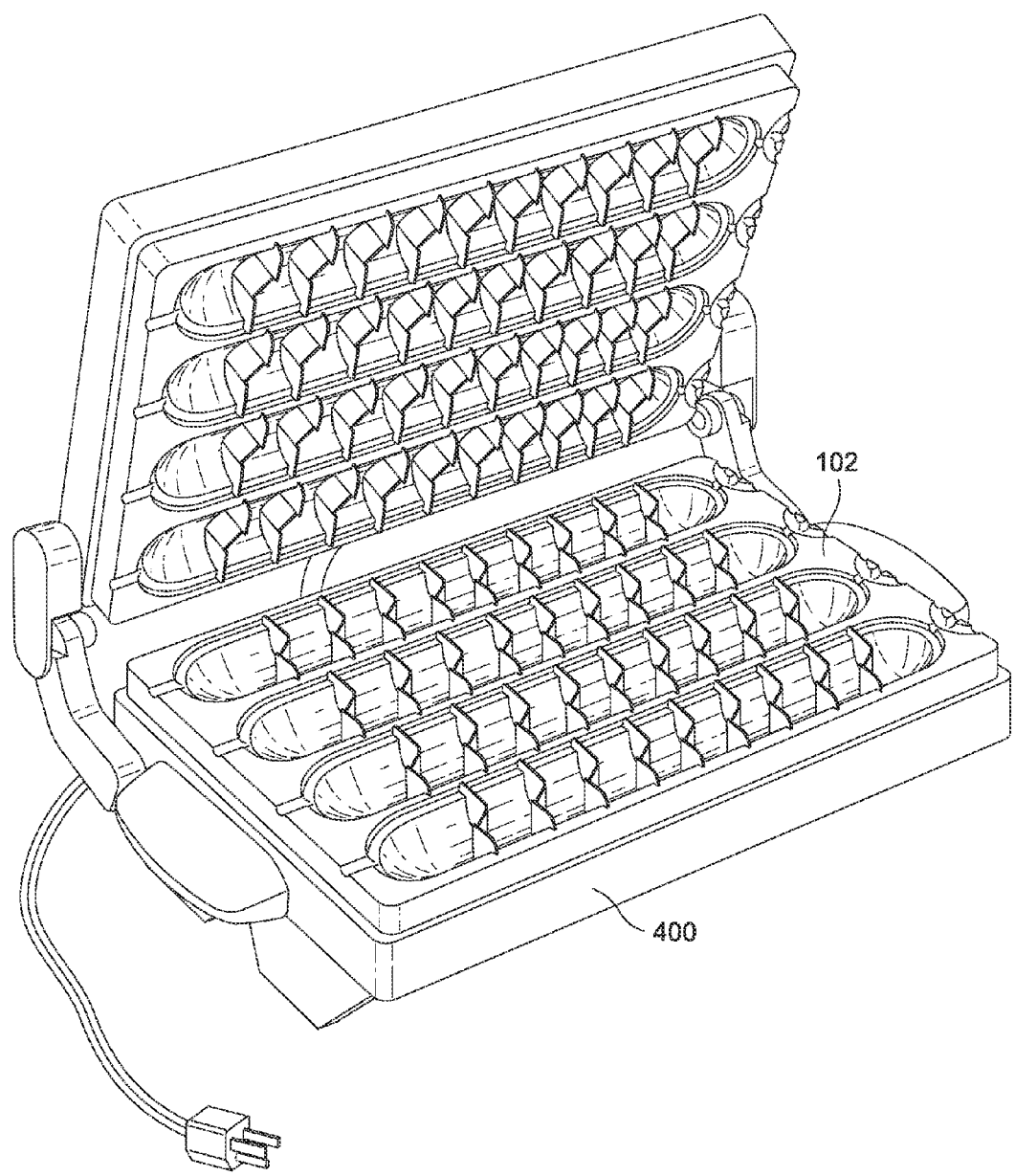
FIG. 11 shows a perspective view of another embodiment of the present invention.
Figure 12:
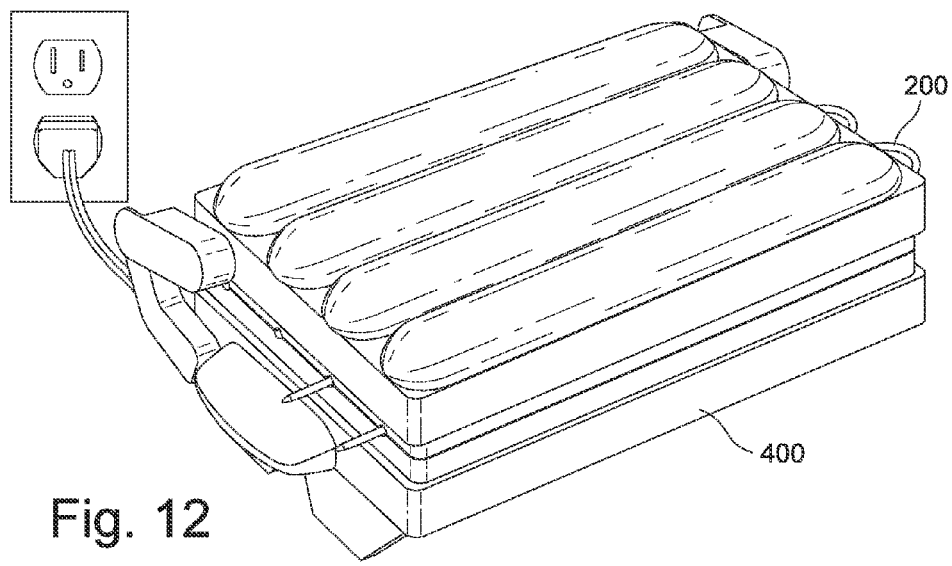
FIG. 12 shows the embodiment in FIG. 11 in the closed configuration.
Figure 13:
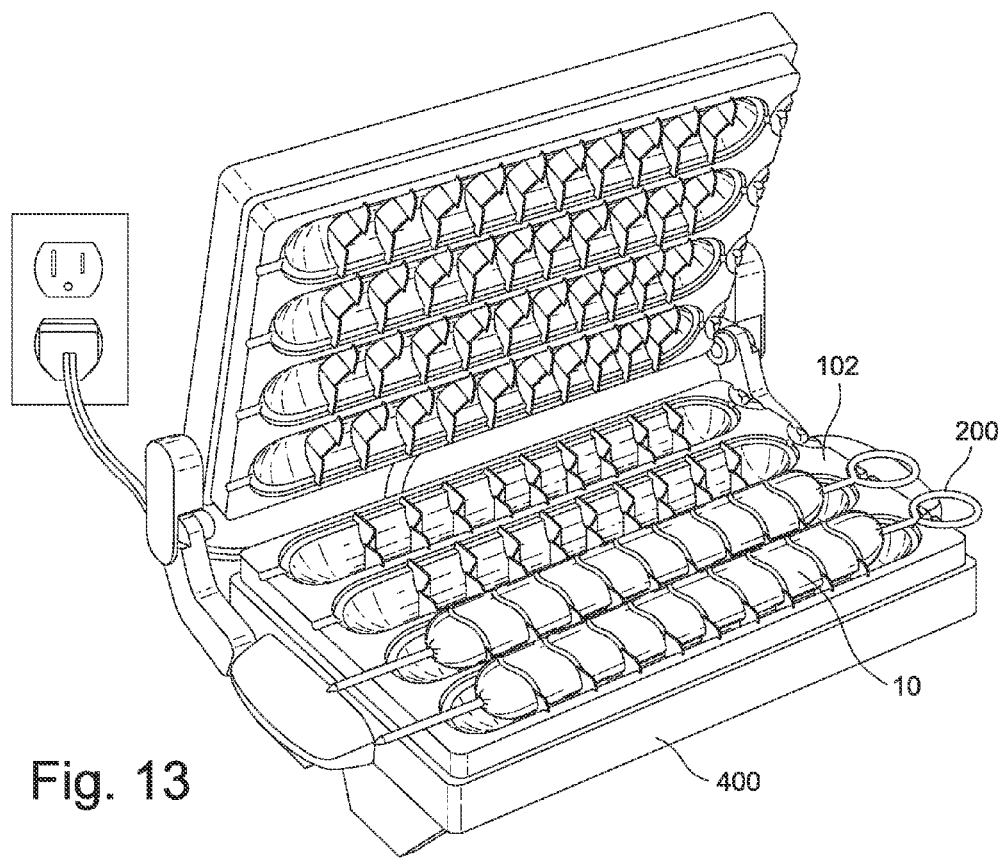
FIG. 13 shows the embodiment in FIG. 12 re-opened after the partial cuts have been made.

To maintain an inner core 22 that remains intact, the bottom intermediate portion 164 of each bottom blade 148a-i may be recessed (in other words made shorter relative to the bottom-front end 160 and the bottom-back end 162) when viewed from the first end 114 or the second end 116 of the housing 102. The recessed portion may be gradual or stepped. Due to the recess, when the sausage is pressed into the bottom blades 148a-i the recessed bottom intermediate portion 164 does not cut into the sausage as deeply, from the bottom to the top, as the bottom-front end 160 and the bottom-back end 162 of the bottom blades 148a-i. In addition, as shown in FIG. 10, the recessed intermediate portion 164 creates a gap between the bottom-front end 160 and the bottom-back end 162. Food products 10 that are cylindrical in shape will naturally tend to reside in the gap, thereby automatically aligning themselves for the proper partial cut. This eliminates the user's effort to keep the food product 10 in proper alignment or positioning for the proper partial cut. In addition, the food product 10 cannot roll away or slip out during the cutting process. In the preferred embodiment, the top blades 138a-i and the bottom blades 148a-i are aligned relative to each other so as to create the partial cut 20 while leaving an inner core 22 intact.

In the preferred embodiment, when the housing 102 is in the closed configuration with the top housing section 104 positioned directly over and contacting the bottom housing section 106, the height of the top blades 138a-i at the top-front end 150 and the top-back end 152 and the height of the bottom blades 148a-i at the bottom-front end 160 and the bottom-back end 162 are tall enough that the top-front end 150 of a first top blade 138a lands directly adjacent to the bottom-front end 160 of a first bottom blade 148a such that a portion of the outer surface 21 of the food product on the front side is cut through (front side cut 32) by a snipping or scissor action as shown in FIG. 2. In the preferred embodiment, due to the "Z"-shaped blades and the height of the blades, the top-back end 152 of a second top blade 138b may land laterally adjacent to the bottom-back end 162 of the first bottom blade 148a, thereby cutting through a portion of the outer surface 21 of the food product (like a snipping or a scissor action) on the back side (back side cut 34), but axially offset from the front side cut 32. Since the top intermediate portion 154 and the bottom intermediate portion 164 are recessed, the top blade 138a and the bottom blade 148a do not cut all the way through the food product 10. However, the top intermediate portion 154 and the bottom intermediate portion 164 are sufficiently tall enough that these two portions cut partially through the top side 30 and the bottom side 36 of the food product 10, respectively, when the housing 102 is closed. Preferably, the top and bottom blades 138a-i, 148a-i are configured to about one-quarter of the diameter of the food product 10 on all sides so that the inner core 22 is only about half the original diameter of the food product 10. The top intermediate portion 154 and the bottom intermediate portion 164 are significantly separated from each other so as not to cut all the way through the food product 10. Therefore, an inner core 22 of the food product 10 remains intact keeping the food product 10 as a single piece. In some embodiments, the heights and widths of the top blades 138a-i and the bottom blades 148a-i can be adjusted to alter the depth of the partial cuts 20 into the food product 10 to create shallow grooves or deep grooves while keeping an inner core 22 intact.

As shown in FIG. 7, due to the oblique angle of the top and bottom intermediate portions 154, 164, the top cut 30 on the sausage connects a first back side cut 34 to a first front side cut 32, and an opposite bottom cut 36 on the food product 10 connects the first front side cut 32 with the next back side cut 38 to create one full helical rotation around the sausage. This pattern continues throughout the length of the food product 10. Once the food product 10 is cooked, the helical pattern becomes prevalent as shown in FIG. 8. Thus, a blade configuration has been designed that efficiently, and effectively cuts spirals into a hot dog. In addition, due to the unique blade configuration, washing the blades 138*a-i*, 148*a*-I is easy because the blades are readily accessible in the open or disassembled configuration. Small or tight crevices or wedges are avoided by the blade configuration.

Once the food product 10 has been partially cut, the integrity of the food product is weakened and the food product 10 can become wedged in between the blades 138*a-i*, 148*a-i*. Therefore, when the top housing section 104 is opened after the partial cut is made, portions of the food product 10 can tear as it gets lifted with the top housing section 104. Similarly, in some instances, the food product may come off of the top housing section 104 but may remain embedded in the bottom housing section 106. Pulling the food product 10 out from the bottom housing section 104 with bare hands can lead to tearing of the food product 10.

To account for this phenomenon, the housing 102 is designed with a guide channel 170 parallel to, and preferably coaxially aligned with, the longitudinal axis 118. The guide channel 170 allows a skewer 200 to be inserted into the housing 102 along the longitudinal axis 118. Based on the design of the housing 102, when the housing 102 is closed with the food product 10 inside, the inner core 22 of the food product 10 that does not get cut, aligns with the guide channel 170. Therefore, insertion of a skewer 200 through the guide channel 170 allows the skewer 200 to pass through the inner core 22 of the food product 10. When the housing 102 is opened, the food product 10 is perfectly impaled along the inner core 22 and the food product can be removed from the housing 102 without tearing the food product 10 along any cut line as shown in FIGS. 6 and 7. The skewer 200 can then be easily removed from the food product 10, and the food product 10 placed on a cooking device 50 for cooking.

As shown best in FIGS. 4 and 7, the skewer 200 comprises an elongated body 202 having a handle 204 at a first end 206 and a free tip 208 at a second end 210 opposite the first end 206. The free tip 208 may be generally sharp for ease of penetrating the food product 10. The handle 204 may come in a variety of shapes and sizes. In the preferred embodiment, the handle 204 is a ring shape. For example, the skewer 200 may be made as a single integral piece of stainless steel with the first end 206 bent into the shape of a ring to form the handle 204. In some embodiments, the handle 204 can be made of other material, such as wood or plastic. In such embodiments, the first end 206 of the skewer 200 may comprise a flanged lip 212 that can serve as a stop separating the handle 204 and the body 202. The stop can prevent over-insertion of the skewer 200 through the food product 10. In addition, as discussed below, the stop can be used for safely storing the skewer 200 in the housing 102.

With reference to FIG. 5, in the preferred embodiment, the flat bottom wall 120 of the top housing section 104 at the first end 114 comprises a first top channel 171 coaxially aligned with the longitudinal axis 118 when in the closed configuration, and the flat bottom wall 120 of the top housing section 104 at the second end 116 comprises a second top channel 172 coaxially aligned with the longitudinal axis 118 when in the closed configuration. In the preferred embodiment, the second top channel 172 may be defined by a first top gap 174 between two bilaterally arranged top-arcuate walls 176, 178 at the second end 116, and a second top gap 180 between two bilaterally arranged top-protrusions 182, 184 at the second end 116. The two bilaterally arranged top-arcuate walls 176, 178 and the two bilaterally arranged top-protrusions 182, 184 define a top-arcuate channel 186 therebetween generally transverse to the second top channel 172.

Similarly, the flat top wall 122 of the bottom housing section 106 at the first end 114 comprises a first bottom channel 188 coaxially aligned with the longitudinal axis 118 when the housing 102 is in the closed configuration, and the flat top wall 122 of the bottom housing section 106 at the second end 116 comprises a second bottom channel 190 coaxially aligned with the longitudinal axis 118 when the housing 102 is in the closed configuration. The second bottom channel 190 is defined by a first bottom gap 192 between two bilaterally arranged bottom-arcuate walls 194, 196 at the second end 116, and a second bottom gap 198 between two bilaterally arranged bottom-protrusions 197, 199 at the second end 116. The two bilaterally arranged bottom-arcuate walls 194, 196 and the two bilaterally arranged bottom-protrusions 197, 199 define a bottom-arcuate channel 195 therebetween generally transverse to the second bottom channel 190.

When the housing 102 is in the closed configuration, meaning the flat bottom wall 120 of the top housing section 104 is on top of the flat top wall 122 of the bottom housing section 106, the first top channel 171 and the first bottom channel 188 are aligned to create a first cylindrical hole, coaxially aligned with the longitudinal axis 118, and the second top channel 172 and the second bottom channel 190 are aligned to form a second cylindrical hole coaxially aligned with the longitudinal axis 118. The cylindrical holes are long and narrow enough to allow the skewer 200 to pass through while limiting any movement radially away from the inner core 22 of the food product, thereby providing a guide channel for the skewer 200 to pass through, preferably, substantially along the longitudinal axis 118 as shown in FIG. 6. In addition, due to the configuration of the top and bottom blades 138*a-i*, 148*a-i*, the skewer 200 is able to pass in between the top and bottom blades 138*a-i*, 148*a-i*. However, lateral movement is restricted by the top and bottom front ends 150, 160 and the top and bottom back ends 152, 162 of the blades 138*a-i*, 148*a-i*. Furthermore, upward and downward movement of the skewer 200 is limited by the top and bottom intermediate portions 154, 164 of the blades 138*a-i*, 148*a-i*. Therefore, the blades 138*a-i*, 148*a-i* also define the guide channel for the skewer 200 to pass only through the inner core 22 of the food product 10.

Figure 9:
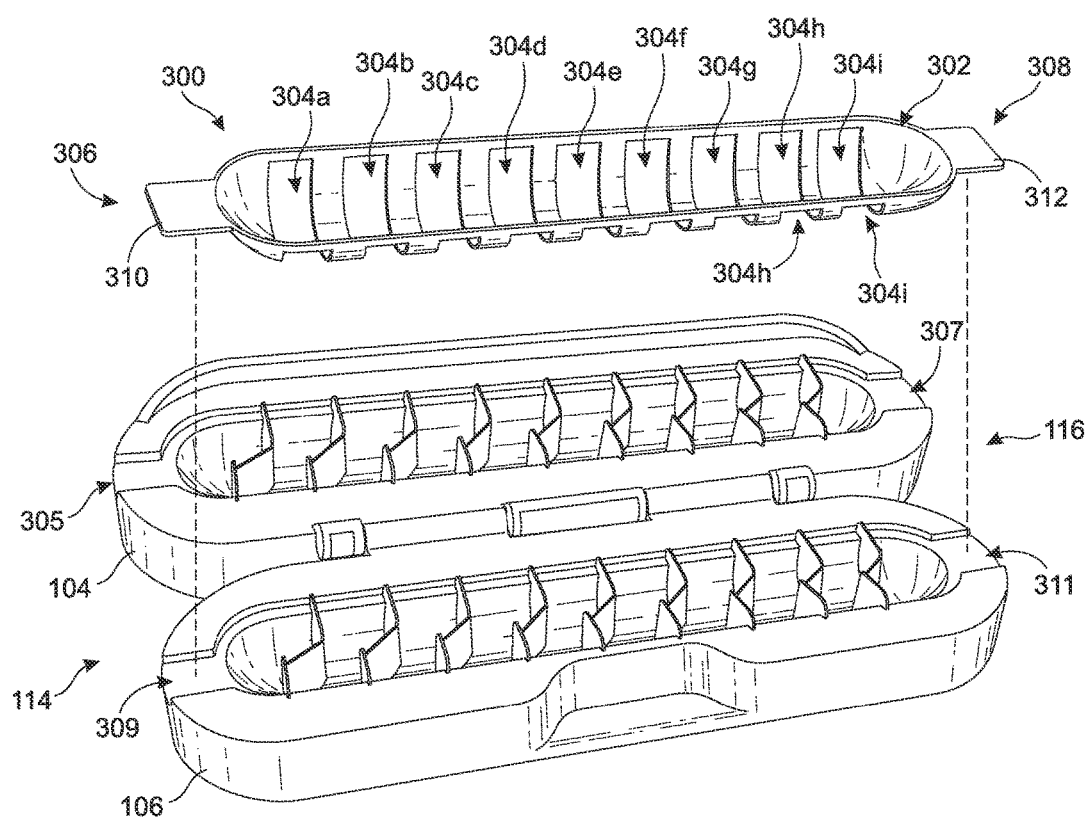
FIG. 9 shows a perspective view of another embodiment of the present invention.

In some embodiments, as shown in FIG. 9, a slotted tray 300 with an open top 302 may be provided as an alternative or additional means to extricate the food product 10 from the housing 102 of the invention without the use of a skewer 200. The slotted tray 300 has dimensions substantially similar to the bottom cavity 146 so that the slotted tray 300 can be seated in the bottom cavity 146. The slotted tray 300 also has a plurality of slots 304*a-i* aligning with the bottom blades 148*a-i* so that when the slotted tray 300 is seated in the bottom cavity 146, the bottom blades 148*a-i* protrude through the slots 304*a-i*. Opposing distal ends 306, 308 of the slotted tray 300 may have protruding lips 310, 312 that function as handles. The protruding lips 310, 312 protrude out past the first and second ends 114, 116 of the bottom housing section 106 so that the user has something to grab to lift the slotted tray 300, and the partial cut food product 10, out of the bottom housing section 106. The top and bottom housing sections 104, 106 at the first and second ends 114, 116 may be recessed 305, 307, 309, 311 to accommodate the protruding lips 310, 312 when in the closed configuration.

In the preferred embodiment, the top housing section 104 and the bottom housing section 106 are hingedly connected together along the back side 112 so as to adopt an open configuration in which the top cavity 136 and the bottom cavity 146 have been moved away from each other so as to be exposed, and a closed configuration in which the top cavity 136 is positioned directly over the bottom cavity 146.

In some embodiments, the housing 102 can function as part of a cooking device as shown in FIGS. 11-14. For example, rather than being made of plastic, the housing 102 may be made of metal, preferably coated with non-stick material. The housing 102 can then be placed in a heating unit 400 to heat up the housing 102, which now functions as a grill that creates the desired partial cuts and also cooks the food product. The heating unit 400 may be a stove top, burner, oven, barbecue grill, fire pit, portable grill (like George Foreman® grill) and the like. Therefore, the heating unit 400 can directly cook the food product 10, or the heating unit can heat a grill, metal housing, or other cooking implement to cook the food product 10.

Additional features can enhance the functionality and user experience of the present invention. As such, the present invention can be provided as a kit for creating partial cuts in a food product. The kit can come with the housing 102 and, optionally, the skewer 200. In some embodiments, the housing 102 may be a grill and the kit can additionally include a heating unit 400 into which the grill can be inserted to cook the elongated food product within the housing 102. To improve the versatility of the kit, the kit may further comprise additional grills 402, 404 that are interchangeable with the housing 102 (the first grill). Additional grills 402, 404 include, but are not limited to, grills comprising a flat, top cooking surface and a flat, bottom cooking surface to cook other types of meats that may not need to be cut, such as steaks and burgers (as shown in FIG. 15A); grills having a top cooking surface with a plurality of protrusions 410 and a bottom cooking surface with a plurality of protrusions 410 for cooking, for example, waffles (as shown in FIG. 15B). In some embodiments, the kit may provide multiple grills, each interchangeable with the other. In some embodiments, a special grill may be provided for the purposes of partially cutting food product 10, while other meats might be cooked in the same heating unit 400 without the employment of any additional grill. So, if a user wanted to cook spiral cut hot dogs and hamburgers, the user could use a housing 102 that functions as a grill (i.e. a metal housing) and insert the housing 102 with the hot dog into the heating unit 400. After the spiral cut hot dogs are cooked, the user could remove the housing 102 and place hamburger patties or steaks directly into the heating unit 400 to cook hamburgers, steaks, and the like.

Figure 16:
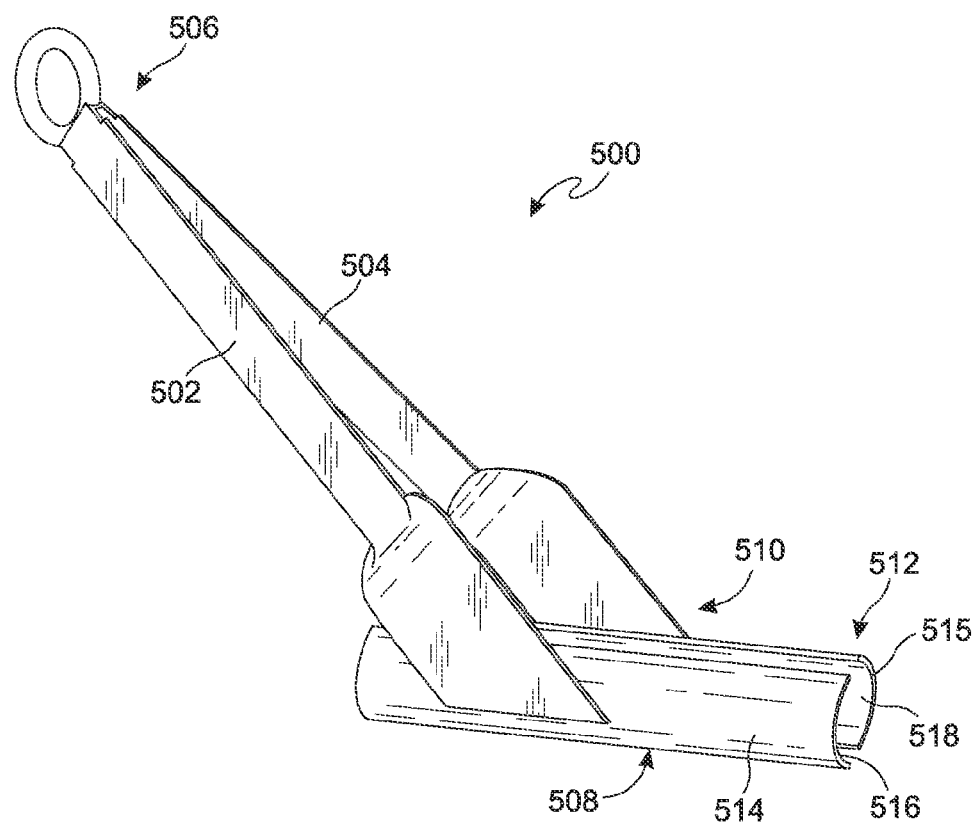
FIG. 16 shows an embodiment of the tongs.

In some embodiments, the kit may further comprise tongs 500 as shown in FIG. 16. Like other tongs, the tongs 500 of the present invention comprises a pair of arms 502, 504 hinged at one end 506 with opposing free ends 508, 510 that are allowed to move towards and away from each other to grip object like a pincher. The tongs 500 of the present invention, however, comprise grippers 512 at the free ends 508, 510. The grippers 512 are elongated bodies 514, 515 that are, preferably, non-parallel to the arms. In some embodiments, the inner surfaces 516, 518 of the elongated bodies 514, 515 are concave in shape. Therefore, when the arms 502, 506 are pinched together, the elongated bodies 514, 515 come together to form generally a cylindrical shape. Using elongated bodies 514, 515 to grasp the elongated food product 10 with partial transverse cuts 20 reduces the chances of tearing the food product 10 in pieces. Once the partial transverse cuts 20 are made into the food product 10, and the food product 10 is cooked, the partial transverse cuts 20 become a point of weakness. Picking up the food product 10 with the transverse cut 20 after it has been cooked increases the susceptibility that the food product 10 will rip at one of the grooved areas 20. A gripper 512 with elongated bodies 514, 515 increases the surface area of contact with the food product 10, thereby reducing the areas of weakness.

In use, creating partial cuts 20 in a food product 10, and in particular, creating generally transverse cuts on an outer surface 21 of an elongated food product 10 while leaving an inner core 22 intact, comprises the step of placing the food product 10 on a bottom housing section 106, the bottom housing section 106 comprising a set of bottom blades 148a-i; placing a top housing section 104 onto the food product 10, the top housing section 104 comprising a set of top blades 138a-i; pressing the top housing section 104 onto the food product 10 until the top housing section 104 abuts against the bottom housing section 106, thereby causing the top blades 138a-i and the bottom blades 148a-i to create a partial cut 20 that is generally transverse along the outer surface 21 of the food product 10 while leaving an inner core 22 portion of the food product 10 intact.

Once the generally transverse cuts are made, it can be difficult to remove the food product from the device without ripping the food product 10 into separate pieces due to the partial cuts 20. Therefore, prior to placing the food product 10 onto the bottom housing section 106 a slotted tray 300 may be placed into bottom housing section 106 with the bottom blades 148a-i protruding through the slots 304a-i of the slotted tray 300. The slotted tray 300 also has handles 310, 312 that project past the first and second ends 114, 116 of the housing 102. After the partial cut 20 has been made, the user can lift the top housing section 104 off of the food product 10. Then, to remove the food product 10, the user simply lifts the slotted tray 300, removes the food product 10 from the slotted tray 300 and places the food product 10 into a heating unit 400.

Sometimes, the food product 10 may be wedged tighter in the top housing section 104 than the bottom housing section 106 and opening the top housing section 104 causes portions of the food product 10 to rise with the top housing section 104 while portions of the food product 10 remain in the bottom housing section 106, thereby tearing the food product 10. Therefore, rather than using the slotted try 300, after the partial cut 20 has been made, the user can insert a skewer 200 through the inner core 22 of the food product 10. Having stabilized the inner core 22 of the food product 10, lifting the top housing section 104 does not lift the food product 10 from the bottom housing section 106. In addition, the user can remove the food product 10 from the bottom housing section 106 simply by lifting the skewer 200.

To make insertion of the skewer 200 easy and to assure the skewer 200 only impales the inner core 22 of the food product 10 and does not deviate from the inner core 22, when in the closed configuration, the top housing section 104 and the bottom housing section 106 along with the top blades 138a-i and the bottom blades 148a-i define a guide channel 170 that keeps the movement of the skewer 200 substantially in line with the longitudinal axis 118.

With reference to FIGS. 4 and 5, for convenient storage, at one end of the housing 116, the top and bottom housing sections each comprise an arcuate channel 186, 195 at one end 114, 116. The arcuate channels 186, 195 provide a place for the handle 204 of the skewer 200 to be seated and locked in place when the housing 102 is in the closed configuration as shown in FIG. 4. The body 202 of the skewer 200 remains secured within the housing 102 so that the sharp tip 208 of the skewer 200 is not exposed when the housing 102 is in the closed configuration. Therefore, the length of the body 202 of the skewer 200 is substantially equal to or smaller than the length of the housing 102.

Preferably, the housing 102 is made from injection molded plastic, such as high impact styrene, ABS, or polypropylene. In some embodiments, the housing 102 is made of material that allows it to function as a grill, such as metal. Therefore, the housing 102 may be placed in a heating unit 400. After the partial cut 20 is made, the user can turn on the heating unit 400 to cook the food product 10 within the housing 102.

The skewer 200 can be made from typical materials used for skewers, such as plastic, wood, metal (such as stainless steel), and the like.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A device for creating a partial cut in an elongated, generally cylindrical food product having a length, the device comprising a housing defining a longitudinal axis, the housing comprising:
   a. a top housing section comprising at least one top blade, the at least one top blade comprising a top-front end, a top-back end, and a top intermediate portion therebetween; and
   b. a bottom housing section comprising at least one bottom blade, the housing configured to receive and house the elongated, generally cylindrical food product and create the partial cut in the elongated, generally cylindrical food product when the housing is placed in a closed configuration, wherein the partial cut is a helical pattern substantially along the length of the elongated, generally cylindrical food product, wherein when the housing is in the closed configuration, the top intermediate portion of the at least one top blade is recessed away from the longitudinal axis, in a step-like manner relative to the top-front end and the top-back end.

2. The device of claim 1, wherein the housing defines a guide channel at a first end of the housing, the guide channel having a diameter substantially the same as a diameter of a skewer for receiving and guiding the skewer along the longitudinal axis.

3. The device of claim 2, wherein the at least one top blade and the at least one bottom blade comprise recesses to allow the skewer to pass through the housing and prevent the skewer from deviating from the longitudinal axis, thereby penetrating the elongated, generally cylindrical food product through the inner core along the longitudinal axis.

4. The device of claim 3, wherein the housing is a grill, wherein when the grill is placed in a heating unit for cooking the elongated, generally cylindrical food product in the housing.

5. A kit for creating a partial cut in a generally cylindrical food product, the kit comprising:
   a. a housing defining a longitudinal axis, the housing comprising a top housing section comprising a plurality of top blades, and a bottom housing section comprising a plurality of bottom blades, the housing configured to receive and house the generally cylindrical food product, wherein each top blade comprises a top-front end, a top-back end, and a top intermediate portion therebetween, wherein each bottom blade comprises a bottom-front end, a bottom-back end, and a bottom intermediate portion therebetween, wherein the top intermediate portion of each top blade is recessed away from the bottom intermediate portion of each bottom blade in a step-like manner relative to the top-front end and the top-back end, wherein the partial cut is a helical pattern substantially along the length of the generally cylindrical food product; and
   b. a skewer.

6. The kit of claim 5, wherein the housing is a first grill.

7. The kit of claim 6, further comprising a heating unit into which the first grill can be placed to cook the generally cylindrical food product in the heating unit.

8. The kit of claim 7, further comprising a second grill interchangeable with the first grill, wherein the second grill comprises a top cooking surface and a bottom cooking surface, wherein the top cooking surface and the bottom cooking surface are flat.

9. The kit of claim 8, further comprising a third grill, interchangeable with the first grill and the second grill, wherein the third grill comprises a top cooking surface and a bottom cooking surface wherein the top cooking surface and the bottom cooking surface comprise a plurality of protrusions.

10. The kit of claim 5, wherein the housing defines a guide channel from a first end of the housing to a second end of the housing for receiving a skewer along the longitudinal axis.

11. The kit of claim 10, wherein the recessed top intermediate portion of each top blade defines a portion of the guide channel to allow the skewer to pass through the housing and prevent the skewer from deviating from the longitudinal axis, thereby penetrating the generally cylindrical food product through the inner core along the longitudinal axis.

12. The kit of claim 11, wherein the housing is a grill, wherein when the grill is placed in a heating unit, the grill cooks the generally cylindrical food product with the partial cut.

13. A device for creating a partial cut in an elongated, generally cylindrical food product having a length, the device comprising a housing defining a longitudinal axis, the housing comprising:
   a. a top housing section comprising a plurality of top blades, each top blade comprising a top-front end, a top-back end, and a top intermediate portion therebetween; and
   b. a bottom housing section comprising a plurality of bottom blades, the housing configured to receive and house the elongated, generally cylindrical food product, wherein the partial cut is a helical pattern substantially along the length of the elongated, generally cylindrical food product, wherein each blade of the plurality of top blades forms a step-like configuration wherein the top-front end and the top-back end of each respective top blade are perpendicular to the longitudinal axis but offset from each other, and the top intermediate portion of each respective top blade connects its respective top-front end and top-back end by passing through the longitudinal axis and creating an oblique angle with the longitudinal axis.

14. A device for creating a partial cut in an elongated, generally cylindrical food product having a length, the device comprising a housing defining a longitudinal axis, the housing comprising:
  a. a top housing section comprising a plurality of top blades, each top blade comprising a top-front end, a top-back end, and a top intermediate portion therebetween; and
  b. a bottom housing section comprising a plurality of bottom blades, each bottom blade comprising a bottom-front end, a bottom-back end, and a bottom intermediate portion therebetween;
  c. the housing configured to receive and house the elongated, generally cylindrical food product, wherein the partial cut is a helical pattern substantially along the length of the elongated, generally cylindrical food product, wherein the top-front end and the top-back end define a first height and the bottom-front end and the bottom-back end define a second height, wherein the first height and the second height are sufficiently tall wherein in a closed configuration the top-front end and the bottom-front end are laterally adjacent to each other to snip a first portion of an outer surface of the elongated, generally cylindrical food product.

15. The device of claim 14, wherein in the closed configuration, the top-back end and the bottom-back end are laterally adjacent to each other to snip a second portion of the outer surface of the elongated, generally cylindrical food product.

16. The device of claim 15, wherein the top intermediate portions of the plurality of top blades and the bottom intermediate portions of the plurality of bottom blades are recessed so as to be shorter than their respective top-front and top-back ends, and their respective bottom-front and bottom-back ends, wherein in the closed configuration, the top intermediate portions of the plurality of top blade cut a third portion of the outer surface of the elongated, generally cylindrical food product, and the bottom intermediate portions of the plurality of bottom blades cut a fourth portion of the outer surface of the elongated, generally cylindrical food product, wherein the first, second, third, and fourth portions of the outer surface result in the helical pattern.

17. A device for creating generally transverse grooves in a sausage-like food product, the device comprising an elongated housing having a front side, a back side opposite the front side, a first end adjacent to the front side and the back side, and a second end opposite the first end and adjacent to the front side and the back side, the elongated housing defining a longitudinal axis through the first and second ends, the housing comprising:
  a. a top housing section comprising a top wall defining a top cavity, and a plurality of top blades protruding downward from the top wall, each top blade having a top-front end adjacent to the front side of the housing, a top-back end adjacent to the back side of the housing, and a top intermediate portion therebetween, each top blade generally parallel to each other and defining a top space therebetween, wherein the top-front end and the top-back end of each top blade is axially offset relative to each other such that the top-back ends of each top blade are closer to one of the first or second ends of the housing relative to their respective top-front ends of the top blades, wherein the intermediate portion is recessed away from the longitudinal axis so as to be shorter than the top-front end and the top-back end, wherein the top housing section at the first end comprises a first top channel coaxially aligned with the longitudinal axis when the housing is closed, and wherein the top housing section at the second end comprises a second top channel coaxially aligned with the longitudinal axis when the housing is closed, wherein the second top channel is defined by a first top gap between two bilaterally arranged top-arcuate walls at the second end and a second top gap between two bilaterally arranged top-protrusions at the second end, wherein the two bilaterally arranged top-arcuate walls and the two bilaterally arranged top-protrusions define a top-arcuate channel therebetween generally transverse to the second top channel; and
  b. a bottom housing section comprising a bottom wall defining a bottom cavity, and a plurality of bottom blades protruding upward from the bottom wall, each bottom blade having a bottom-front end adjacent to the front side of the housing, a bottom-back end adjacent to the back side of the housing, and a bottom intermediate portion therebetween, each bottom blade generally parallel to each other and defining a bottom space therebetween, wherein the bottom-front end and the bottom-back end of each bottom blade is axially offset relative to each other such that the bottom-front ends of each bottom blade are closer to one of the first or second ends of the housing relative to their respective bottom-back ends of the bottom blades, wherein the bottom intermediate portion is recessed away from the longitudinal axis so as to be shorter than the bottom-front and bottom-back ends, wherein the bottom housing section at the first end comprises a first bottom channel coaxially aligned with the longitudinal axis, and wherein the bottom housing section at the second end comprises a second bottom channel coaxially aligned with the longitudinal axis, wherein the second bottom channel is defined by a first bottom gap between two bilaterally arranged bottom-arcuate walls at the second end and a second bottom gap between two bilaterally arranged bottom-protrusions at the second end, wherein the two bilaterally arranged bottom-arcuate walls and the two bilaterally arranged bottom-protrusions define a bottom-arcuate channel therebetween generally transverse to the second bottom channel,
  c. wherein when the top housing section and the bottom housing section are coupled together along the back side so as to adopt an open configuration in which the top cavity and the bottom cavity have been moved away from each other so as to be exposed, and a closed configuration in which the top cavity is positioned directly over the bottom cavity, wherein when the housing is in the closed configuration, the top blades are offset from the bottom blades such that the top blades and the bottom blades alternate from the first end to the second end, and wherein in the closed configuration, the first top channel and the first bottom channel are aligned to create a first cylindrical hole, coaxially aligned with the longitudinal axis, and the second top channel and the second bottom channel are aligned to form a second cylindrical hole coaxially aligned with the longitudinal axis.

18. The device of claim 17, further comprising a skewer insertable through the first cylindrical hole and the second cylindrical hole along the longitudinal axis.

19. The device of claim 17, wherein the housing is a metal grill for cooking the food product in a heating unit.

20. A method for creating a partial cut in an outer surface of a generally cylindrical food product while leaving an inner core intact using a device comprising a housing defining a longitudinal axis, the method comprising:
  a. placing the generally cylindrical food product on a bottom housing section, the bottom housing section comprising a set of bottom blades, each bottom blade comprising a bottom-front end, a bottom-back end, and a bottom intermediate portion therebetween;
  b. placing a top housing section onto the generally cylindrical food product, the top housing section comprising a set of top blades, each top blade comprising a top-front end, a top-back end, and a top intermediate portion therebetween;
  c. pressing the top housing section onto the generally cylindrical food product until the top housing abuts the bottom housing, wherein the top intermediate portion is recessed both away from the longitudinal axis as well as relative to the top-front end and the top-back end so as to create the partial cut along the outer surface of the generally cylindrical food product while leaving the inner core portion of the generally cylindrical food product intact when the top housing section is pressed against the bottom housing section, whereby the partial cut in the outer surface of the generally cylindrical food product is created with a single snipping action such that a plurality of top-front ends of the top blades are laterally adjacent to a respective plurality of bottom-front ends of the bottom blades when the top housing abuts the bottom housing.

21. The method of claim 20, further comprising inserting a skewer through the inner core of the generally cylindrical food product for removing the generally cylindrical food product having the partial cut from the bottom housing section.

22. The method of claim 21, wherein the recessed top intermediate portion defines a guide channel for the skewer to remain within the inner core of the generally cylindrical food product.

23. The method of claim 22, wherein the skewer is stored in the guide channel.

24. A method for creating a partial cut in an outer surface of an elongated food product while leaving an inner core intact using a device comprising a housing defining a longitudinal axis, the method comprising:
  a. placing the elongated food product on a bottom housing section of the housing, the bottom housing section comprising a set of bottom blades, each bottom blade comprising a bottom-front end, a bottom-back end, and a bottom intermediate portion therebetween;
  b. placing a top housing section of the housing onto the elongated food product, the top housing section comprising a set of top blades, each top blade comprising a top-front end, a top-back end, and a top intermediate portion therebetween;
  c. pressing the top housing section onto the elongated food product until the top housing section abuts the bottom housing section, wherein the top intermediate portion is recessed both away from the longitudinal axis as well as relative to the top-front end and the top-back end so as to create the partial cut along the outer surface of the elongated food product while leaving the inner core of the elongated food product intact when the top housing section is pressed against the bottom housing section, whereby the partial cut in the outer surface of the elongated food product is created with a single snipping action such that a plurality of top-front ends of the top blades are laterally adjacent to a respective plurality of bottom-front ends of the bottom blades when the top housing section abuts the bottom housing section; and further comprising placing a slotted tray comprising a plurality of slots onto the bottom housing section prior to placing the elongated food product onto the bottom housing section, wherein each blade of the set of bottom blades protrudes through a corresponding slot of the slotted tray.

25. The method of claim 20, further comprising cooking the elongated food product within the top housing section and the bottom housing section.

* * * * *